United States Patent [19]

Anastassiou et al.

[11] Patent Number: 4,695,884
[45] Date of Patent: Sep. 22, 1987

[54] CORRECTION OF SHADING EFFECTS IN VIDEO IMAGES

[75] Inventors: Dimitris Anastassiou, New York; William B. Pennebaker, Carmel, both of N.Y.

[73] Assignee: International Business Machines Corporation, Armonk, N.Y.

[21] Appl. No.: 697,300

[22] Filed: Feb. 1, 1985

Related U.S. Application Data

[63] Continuation-in-part of Ser. No. 454,909, Dec. 30, 1982, abandoned.

[51] Int. Cl.⁴ .................. H04N 5/14; H04N 5/228; G06K 9/38
[52] U.S. Cl. .................... 358/163; 358/166; 358/284; 382/51
[58] Field of Search ............. 358/163, 166, 167, 282, 358/284; 382/51, 54

[56] References Cited

U.S. PATENT DOCUMENTS

| | | | |
|---|---|---|---|
| 3,621,129 | 11/1971 | Fisher | 358/166 |
| 3,800,078 | 3/1974 | Cochran et al. | 358/166 |
| 3,979,555 | 9/1976 | Opittek et al. | 358/166 |
| 4,232,400 | 11/1980 | Yamamoto et al. | 358/167 |
| 4,493,106 | 1/1985 | Farhangi et al. | 382/51 |
| 4,504,864 | 3/1985 | Anastassiou et al. | 358/167 |
| 4,504,972 | 3/1985 | Scherl et al. | 382/51 |
| 4,578,712 | 3/1986 | Matsunawa | 382/51 |

Primary Examiner—James J. Groody
Assistant Examiner—Michael D. Parker
Attorney, Agent, or Firm—Thomas P. Dowd

[57] ABSTRACT

Video images are corrected for shading effects by generating a histogram of picture element (pel) gray scale intensity values and calculating the median and the black and white extremes thereof. A range of permitted background gray scale values is empirically selected such as by calculating the distance between the median and the closest color extreme and setting the range as twice that distance centered at the median. A background image is then created by sampling the intensity values of the original image pels and using a look-up table to remap the image. In one embodiment, pel intensity values are compared with the median value and only corrections lying within the range are carried out. In another embodiment the original image pels are remapped from 8 bits to 5 bits with all values outside the permitted range set to that of the nearest color extreme. A duplicate image is created from the remapped image and the intensity values of a number of pels in a predetermined region about a first pel in this image are sampled and the value of the corresponding pel in the background image is changed to the largest value among those of the first pel and the sampled pels. This sampling and changing is continued using a look-up table with a 7 bit output until all of the pels in the background image have been changed accordingly. The duplicate image is then changed to conform to the changed background image and the sampling procedure is carried out over a larger surrounding region, or neighborhood, and a larger number of pels with the corresponding changes being made in the background image. The foregoing conforming, sampling, and changing operations may be repeated until a background image with the desired level of shading correction is achieved.

12 Claims, 19 Drawing Figures

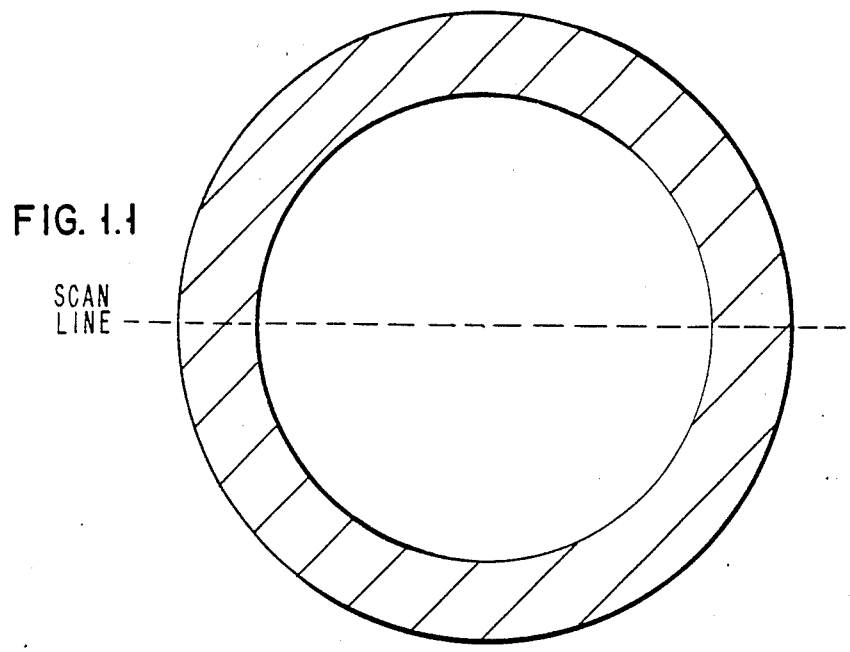
FIG. 1.1
SCAN LINE
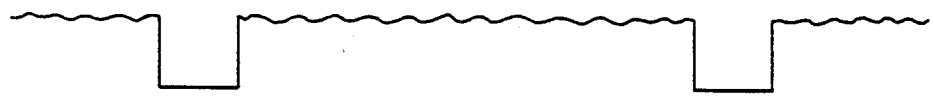
FIG. 1.2
IDEAL VIDEO SIGNAL
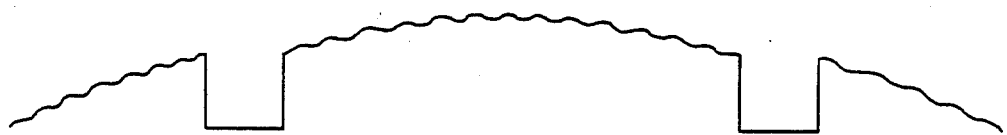
FIG. 1.3
VIDEO SIGNAL WITH SHADING DEFECTS

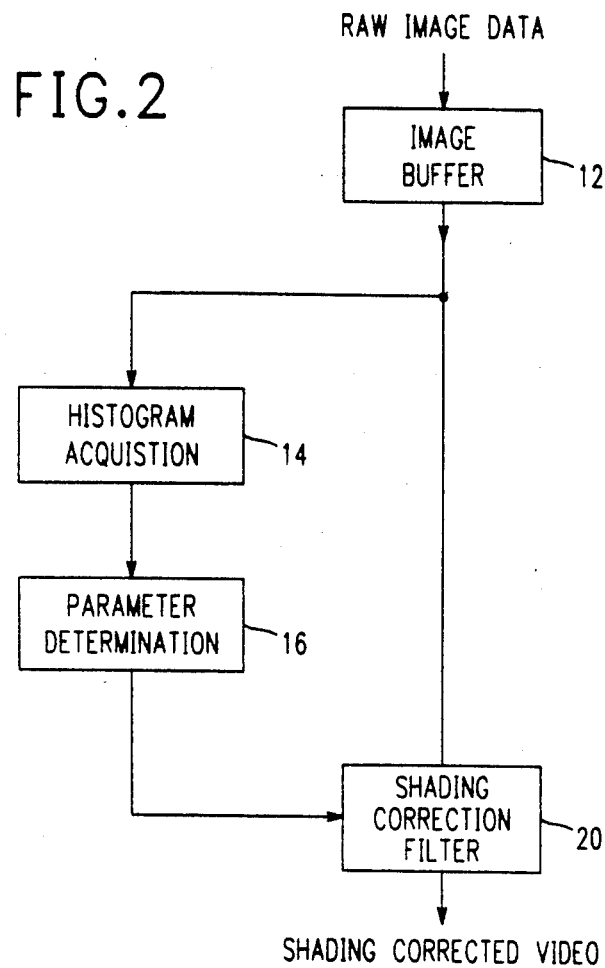

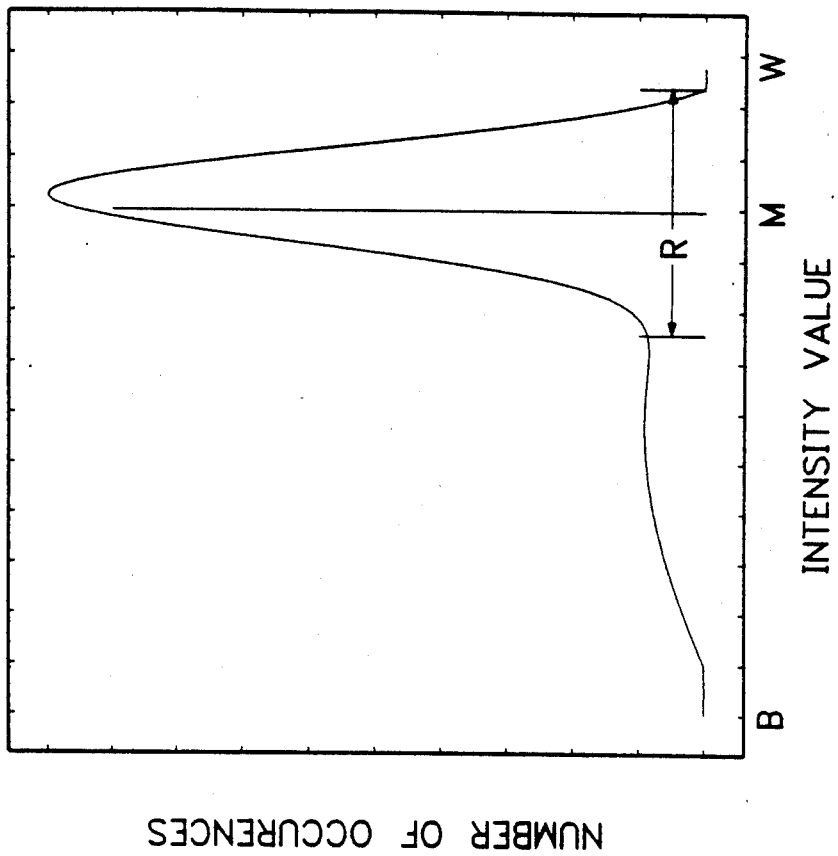
FIG. 3.1

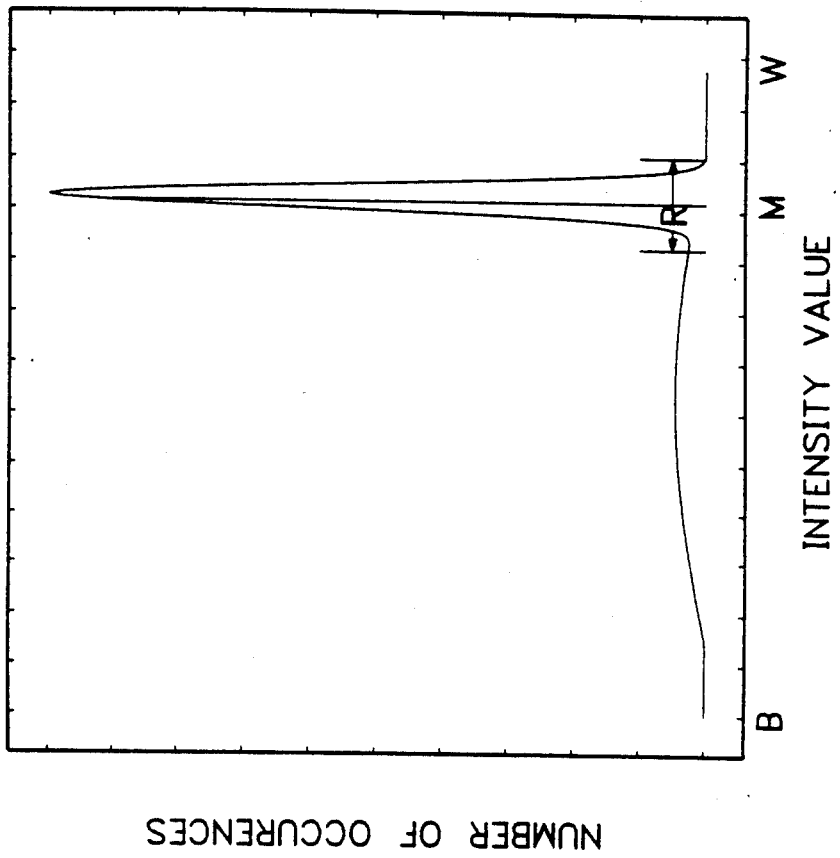
FIG.3.2

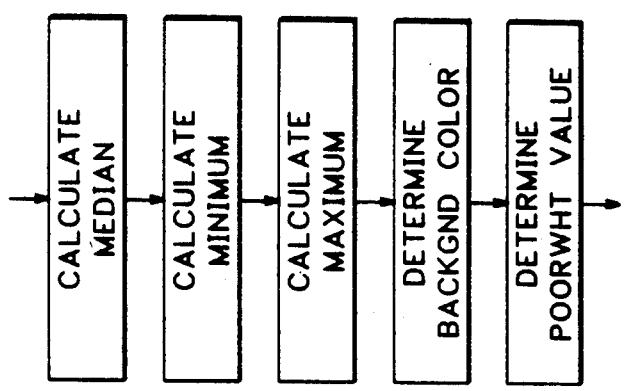
FIG. 4.1

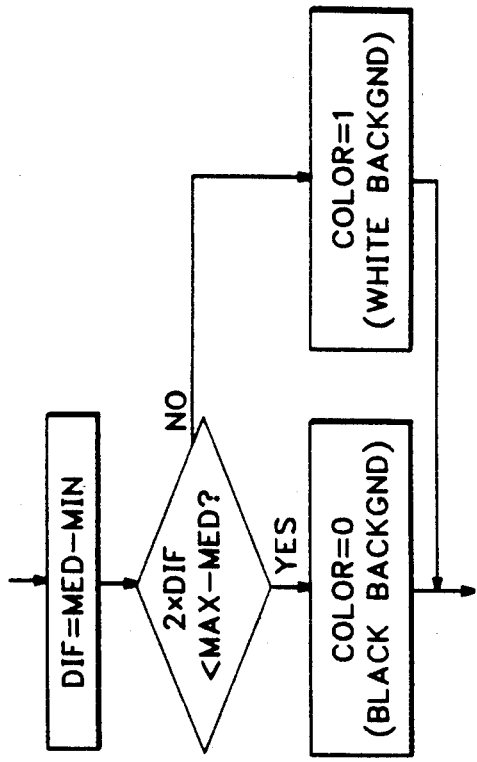
FIG. 4.2  BACKGROUND COLOR DETERMINATION

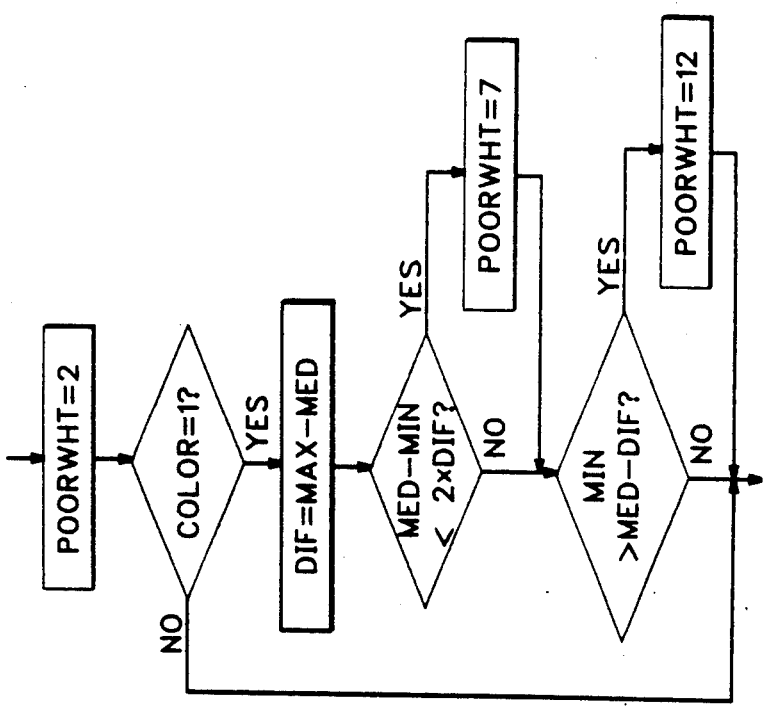
FIG. 4.3 POORWHT DETERMINATION

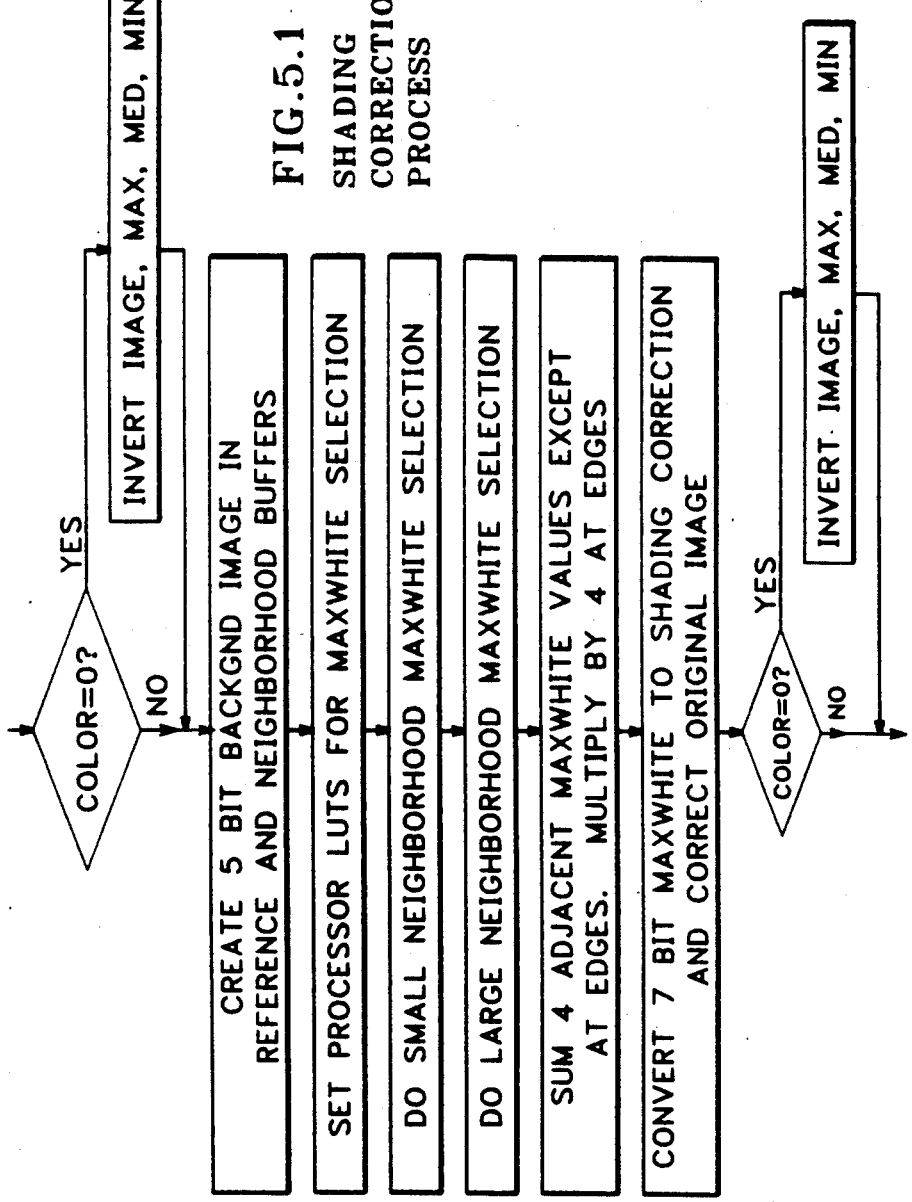

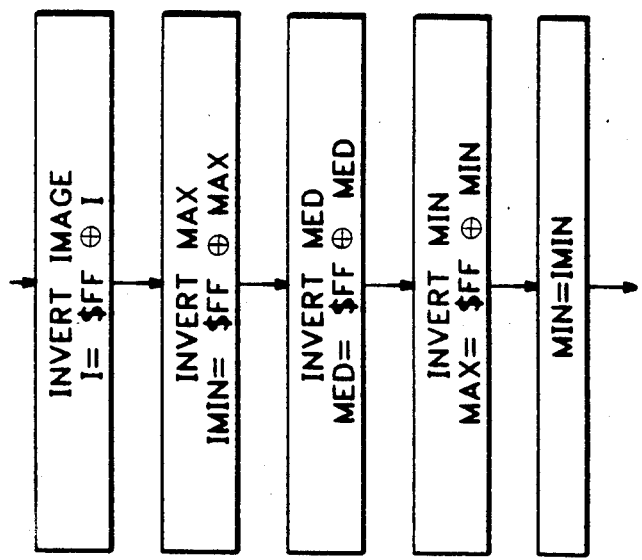
FIG. 5.2 INVERT IMAGE, MAX, MED AND MIN

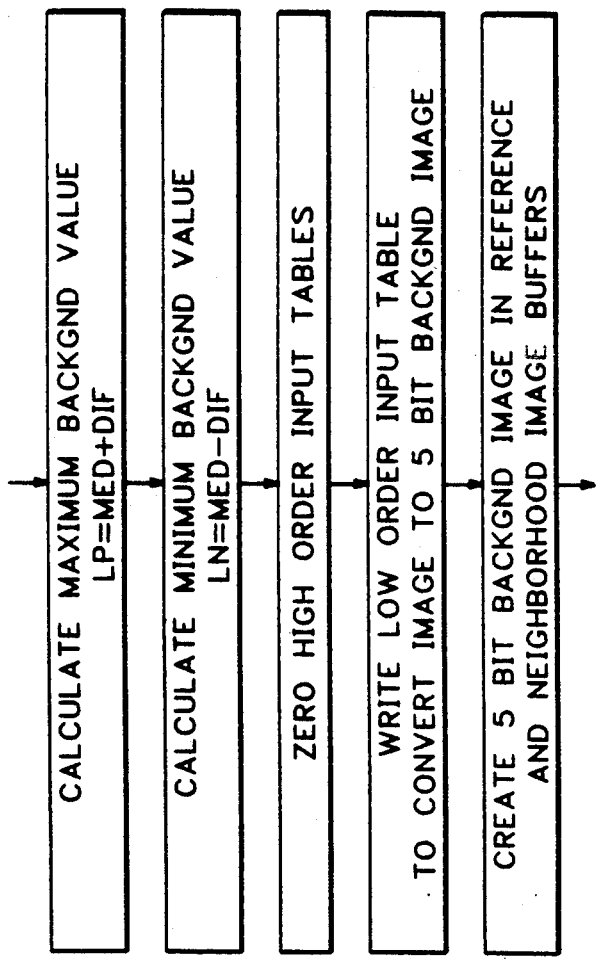

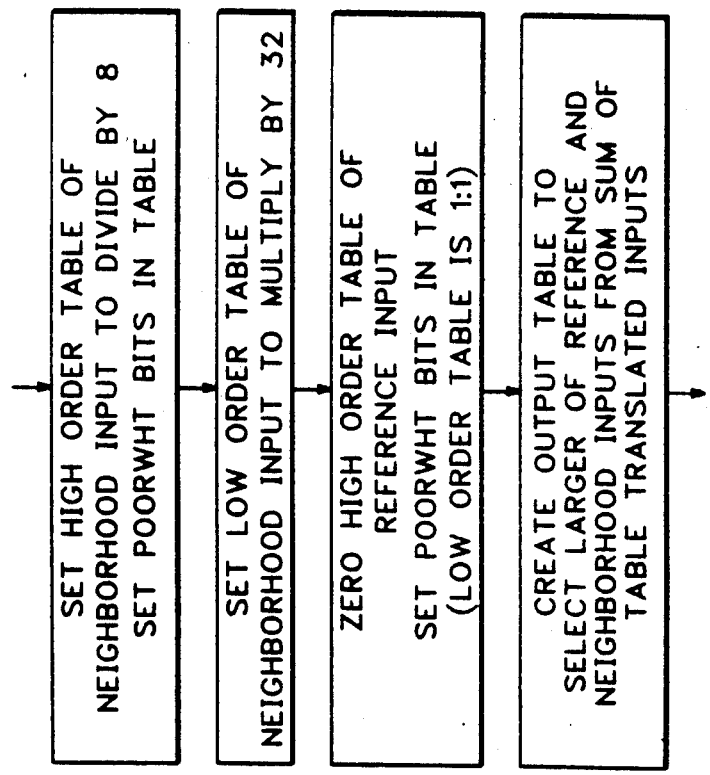
FIG. 5.4
SET PROCESSOR LUTS FOR MAXWHITE SELECTION

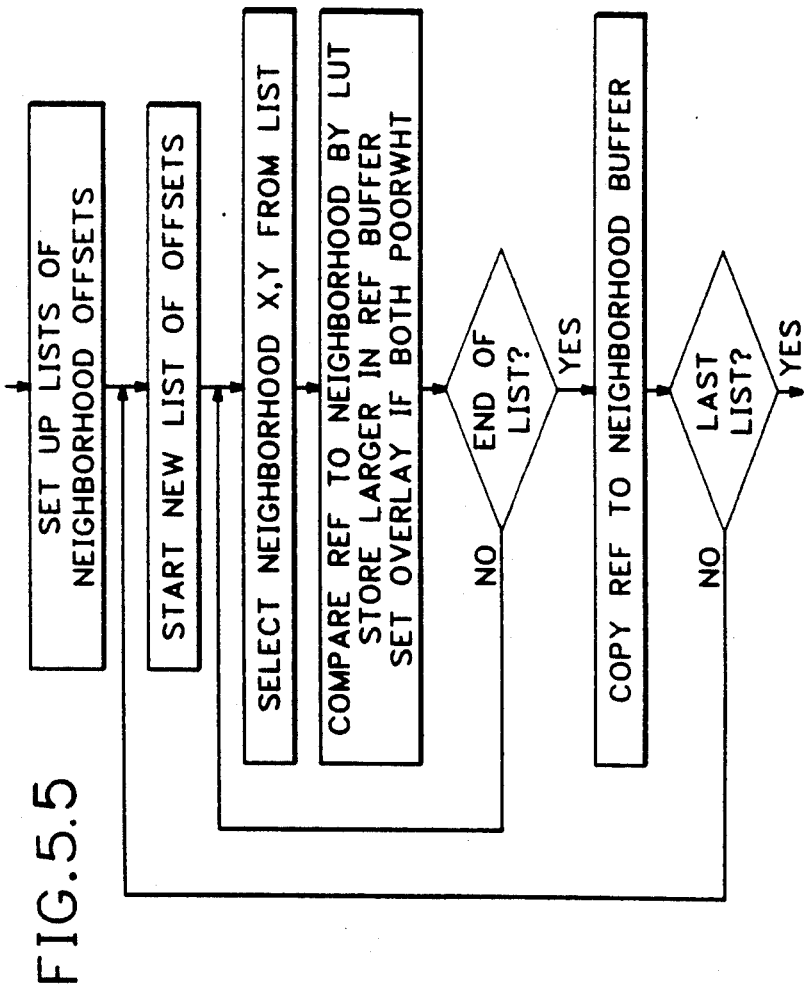
FIG. 5.5 SMALL NEIGHBORHOOD MAXWHITE SELECTION

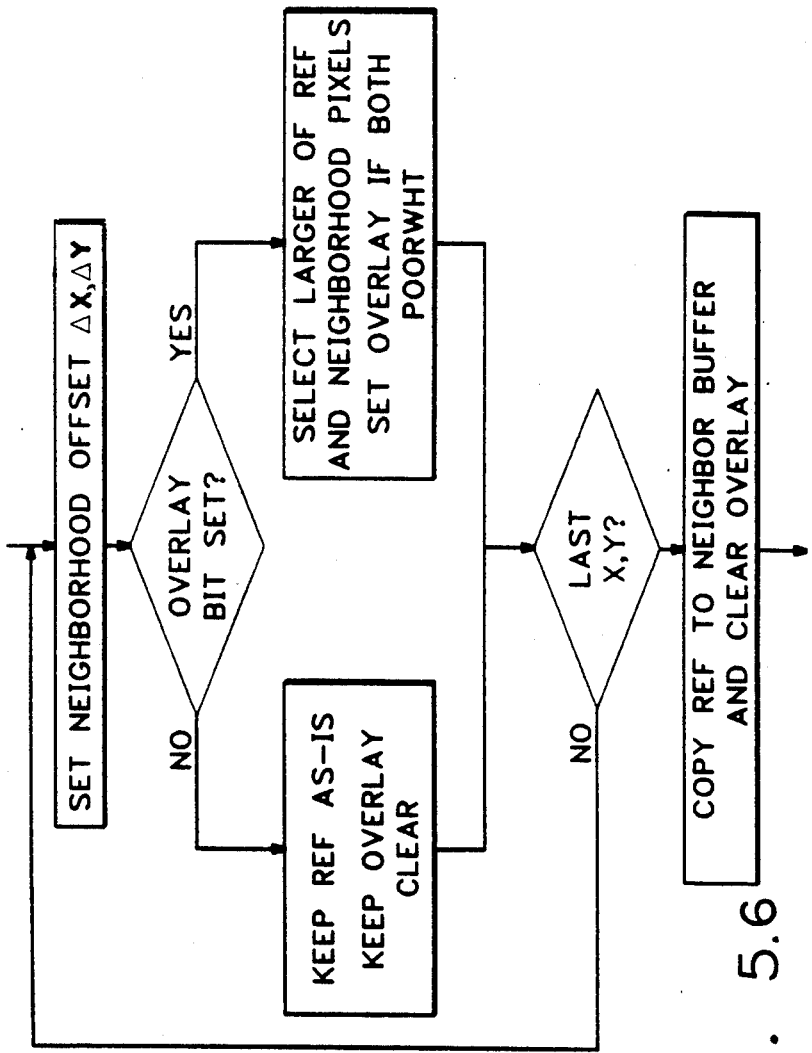
FIG. 5.6

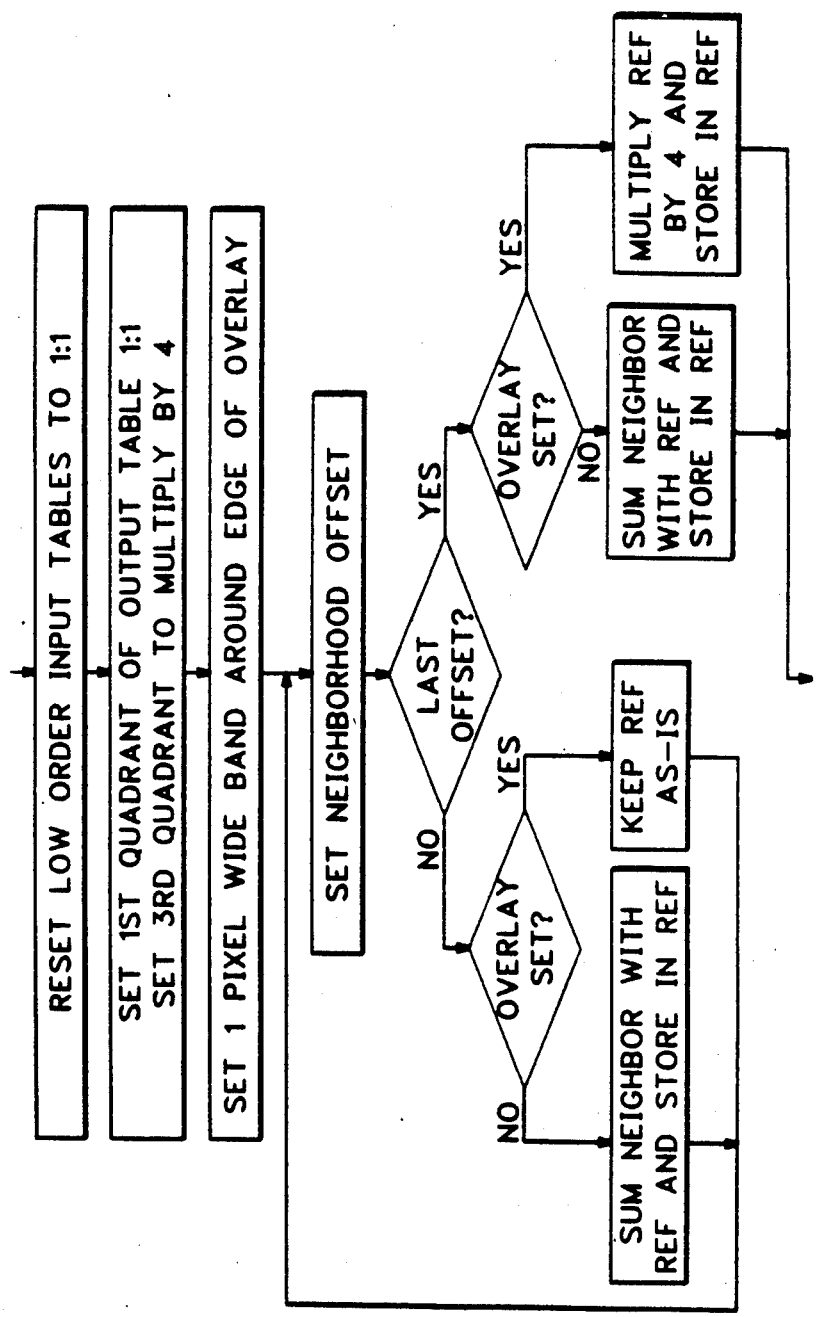
FIG. 5.7  SUMMING OF 4 MAXWHITE PIXELS EXCEPT AT IMAGE BORDERS

FIG. 6.1 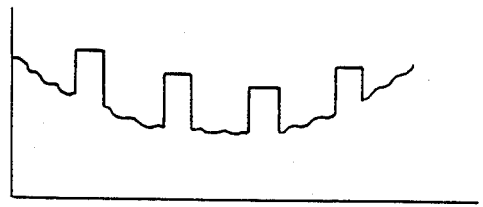
FIG. 6.2 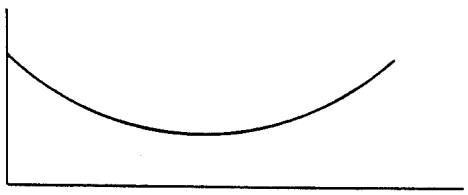
FIG. 6.3 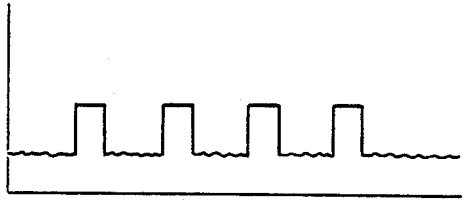

CORRECTION OF SHADING EFFECTS IN VIDEO IMAGES

CROSS-REFERENCE

This is a continuation-in-part application based on our parent application Ser. No. 454,909, filed Dec. 30, 1982, now abandoned.

DESCRIPTION

BACKGROUND OF THE INVENTION

1. Field of the Invention

The present invention relates to image data enhancement apparatus and methods, and more particularly to apparatus and methods of filtering undesired shading effects from video images.

2. Description of the Prior Art

In the prior art there are many image data processing systems available. Some examples of systems representative of the prior art are the following.

U.S. Pat. No. 3,621,129 to Fisher relates to devices for enhancing images by quantizing picture element levels into binary digital signals employing a threshold which is derived from the gray scale values of the image under analysis. The apparatus of the patent examines gray scale values of picture elements immediately preceding and succeding a feature under analysis and a variable threshold is generated which is derived from a mean value between the maximum white signal level and the maximum black signal level immediately before and after the feature under analysis.

The patented system does not acquire a histogram of distribution of gray scale intensity levels in the entire image to provide a uniform correction but rather provides only a localized threshold calculation.

U.S. Pat. No. 3,979,555 to Oppitek relates to a histogram equalized system that adaptively redistributes the intensity levels of video signals in order to provide an equal number of elements at all display intensity levels.

This patented system does not relate generally to a method of correcting shading effects in video images where a correction value is calculated from the variations in background level in the entire image.

U.S. Pat. No. 3,800,078 to Cochran teaches a digitally compensated scanning system wherein an initial scan of black or background information is stored in a look-up table and compared to desired data signals to eliminate undesired variations or noise resulting from photodiode leakage current or other noise sources.

This patent does not show a method of correcting shading effects in video images in which a histogram of distribution of gray scale intensity levels is acquired and used to calculate a threshold value and a range of permissable background gray scale values that generates a correction signal which when combined with the raw data provides an output signal that is corrected for undesired shading effects.

U.S. Pat. No. 4,232,400 to Yamamoto shows an echo control system for an adaptive echo canceller which cancels an echo signal while successively estimating the transmission characteristic of an echo path that includes means for filtering by convolution a transmitted signal including echo characteristics.

The patent does not teach a method of correcting shading effects in video images using a histogram of distribution of gray scale intensity levels for calculating maximum white, maximum black and threshold values and generating a correction signal to eliminate shading effects.

An article entitled "Digital Processing Techniques for Encoding of Graphics" by Ting and Prasada, which appeared in the Proceedings of the IEEE, Vol. 68, No. 7, July 1980 at page 757 and following, provides a survey of techniques for preprocessing input documents having noise contents which create poor data compression ratios.

The article discusses a piece-wise local approach to shading correction in which a number of small overlapping samples or windows are examined and a threshold is established for each of these windows. The approach presents a potential problem with respect to different thresholds at either side of a boundary between adjacent windows. Discontinuities in the threshold going from window to window may result in undesired effects in the image. The article does not present a global shading correction algorithm in which the shading for the entire image is corrected without discontinuity.

Other articles discussing the general problem of thresholding are found in IEEE Transactions on Systems, Man, and Cybernetics, Vol. SMC-8, No. 8, August 1978, at pps. 622–632. The segmentation of an image into background and foreground regions is discussed as well as the general technique of background sampling in the region of an object and the difficulties in the choice of background samples.

However, a simple and effective method and means for correcting shading effects in video images is not found among this art.

It will therefore be seen that the prior art discussed above neither teaches nor suggests the present invention as disclosed and claimed herein.

SUMMARY OF THE INVENTION

Accordingly, it is an object of the present invention to provide methods and means for correcting shading effects in video images having a plurality of picture elements where each picture element or pel may be represented by a gray scale intensity value. The method of the invention involves e.g., in suitable computer means, the steps of generating a histogram of distribution of gray scale intensity values of picture elements in the original image, and calculating a maximum white gray scale value, a maximum black gray scale value and an intermediate gray scale value, such as the median, from the histogram. The image polarity, that is the background color, may then be determined empirically by noting which of the gray scale extremes is located closest to the intermediate value. A range of permitted background gray scale intensity values is then selected such as by calculating the distance between the median and the background or majority color extreme and setting the range as twice that distance centered at the median. Having established these parameters, two approaches are presented for correcting for shading effects.

In the first embodiment a lookup table (LUT) is constructed which remaps the original image to a correction image. The original intensity value of each pel is compared with the median value and the LUT output represents the difference between the two. If the difference is outside the permitted range, no correction is made; otherwise, the difference is used to correct the original intensity. A neighborhood sampling procedure is carried out for each pel to obtain an average value for each correction.

In the latter embodiment, a first background image is created, e.g., in a "reference" buffer, by sampling the gray scale intensity value of each pel in the original image to be corrected and using a suitable look-up table (LUT) to remap the image from 8 bits to 5 bits with all values outside the permitted or acceptable range set to that of the nearest color extreme. A duplicate background image is then created from the remapped image, e.g., in another or "neighboring" buffer. Sampling of the gray scale intensity values of a number of pels in a predetermined region around a first pel in the duplicate image is then carried out and the gray scale value of the corresponding pel in the first background image to be corrected for shading is changed to the largest value (assuming the majority color extreme to be larger) among those of the first pel and the sampled pels. This operation may be accomplished using a 10 bit LUT by making the 5 bits representing the first pel value the low order input and those of the sampled neighboring pel the high order input. The difference output may be in 8 bits. This sampling and changing is continued until all of the pels in the background image have been changed accordingly. The duplicate background image is then changed to conform to the changed first background image and the sampling procedure is carried out over a larger surrounding region and a larger number of pels with the corresponding changes in the first background image. This procedure may be repeated until a background image with the desired level of shading corrections is achieved.

It is another object of the present invention to correct shading effects in video images as above by further including the step of determining, during the sampling over the surrounding region, if the corrected gray scale value of each pel in the background image is less than a predetermined value. This is accomplished by detecting "low" pel values or poor whites (poorwht) and storing indications of such in an overlay plane, which indications are changed when appropriate during successive samplings. Subsequent samplings may then be carried out only on pels with low value indications until the desired correction level is achieved.

It is yet another object of the present invention to correct shading effects about the edges of video images and a method and means for this purpose is also described.

Therefore, an apparatus for correcting shading effects in video images according to the present invention employs an image processing system including: a plurality of full image buffers; means for generating an histogram of, and providing the histogram calculations for, the image to be corrected; means for creating a background image and a duplicate background image in the buffers; means for controlling the operation of the image processor for sampling the gray scale intensity values of picture elements in a region around a current picture element to be corrected in the duplicate background image; means for correcting the value of the corresponding current picture element in the background image using the background gray scale value determined from the previous step; means for executing the sampling and correcting steps for each picture element in the duplicate and background images and conforming the former to the latter upon completing all of the corrections; and means for repeating the preceding steps to provide a uniform shading correction throughout a video image.

The foregoing and other objects, features and advantages of the invention will be apparent from the more particular description of the preferred embodiments of the invention, as illustrated in the accompanying drawing.

BRIEF DESCRIPTION OF THE DRAWINGS

FIG. 1.1 illustrates a character of a video image intercepted by a scal line to produce a video signal.

FIG. 1.2 shows an idealized video signal generated from the scanned character of FIG. 1.1.

FIG. 1.3 shows a video signal as in FIG. 1.2 including shading defects from camera characteristics, lighting or the like.

FIG. 2 is a general block diagram of apparatus according to the present invention for correcting shading defects in a video image.

FIG. 3.1 is a diagram illustrating a histogram of the number of occurrences of pel intensity values before shading correction.

FIG. 3.2 is a histogram as in FIG. 3.1 after shading correction has been performed in accordance with the apparatus and method of the present invention.

FIG. 4.1 is a general diagram of the steps involved in analyzing a histogram to determine parameters to be used for the shading correction.

FIG. 4.2 is a flow chart of the steps used in determining image background color.

FIG. 4.3 is a flow chart of the steps used in determining the poor white (POORWHT) range.

FIG. 5.1 is a general flow chart illustrating the operation of the shading correction filter.

FIG. 5.2 shows the steps involved in inverting the image when the background color has been determined to be black.

FIG. 5.3 shows the steps involved in creating a background image in a five bit representation.

FIG. 5.4 shows the steps used to create the look-up tables for selecting the whiter of two background image values.

FIG. 5.5 is a flow chart of the initial maximum white selection process carried out in a small neighborhood around each pel of the background image.

FIG. 5.6 is a flow chart of the maximum white selection process carried out in a large neighborhood wherever the maximum white image remains in the POORWHT range.

FIG. 5.7 is a flow chart of the summation process used to filter any noise in the maximum white background image.

FIG. 6.1 is a diagram showing an uncorrected video signal having a concave shading defect.

FIG. 6.2 is a diagram showing the concave shading defect isolated from the video signal in accordance with the present invention.

FIG. 6.3 is a diagram showing the shading corrected video signal in accordance with the present invention.

DETAILED DESCRIPTION OF THE PREFERRED EMBODIMENT

Most images, captured from television cameras have substantial shading problems, even when the cameras incorporate shading correction circuitry. The shading, or low spatial frequency variations, in the image can cause problems when the image is to be converted by thresholding to a graphics image having one or two bits per pel (picture element). Apparatus and methods are disclosed herein for correcting these shading effects and while those skilled in the art may adapt the invention to use in many different ways drawing from the following description, the present invention may be particularly implemented using a commercially available image processor, such as a Grinnell GMR-270, operating under the control of a digital data processing system, such as the IBM Series I, so that the description will be directed to such an implementation.

Referring firstly to FIGS. 1.1, 1.2 and 1.3, the generation of a video signal with shading effects will be discussed. FIG. 1.1 shows a text data character such as 0 being intercepted by a horizontal scan line.

Ideally, a black character on a white paper background would produce a video signal such as is shown in FIG. 1.2 having a relatively uniform flat background white level except for areas where black text data occurs at which point the video signal would switch to the black level.

As can be seen in FIG. 1.3, the actual video signal representative of the 0 of FIG. 1.1 includes shading effects which create ambiguities in separating text data from background in an image. It can be seen in FIG. 1.3, that the shading of the white paper background causes a gray scale variation in areas where no text data appears which can inhibit efficient data compression and transmission and create undesired artifacts in the transmitted image.

Referring now to FIG. 2, a block diagram of apparatus according to the present invention is illustrated. A video signal containing image data is stored in image buffer 12 in such a way that access may be had to an intensity value for each pel in an image. The data in image buffer 12 is sampled by a histogram acquisition circuit 14 to determine the gray scale level distribution of pels in the image. FIG. 3.1 shows the form of a resulting histogram for a graphics image before shading correction. Note that for a black data-on-white background graphics image the majority of pels are normally near the white intensity values since in a black-on-white graphics image there are usually many more background pel positions than there are data pel positions. There are many techniques for acquiring and presenting histogram information including that shown in U.S. Pat. No. 3,979,555 discussed above. Once the histogram has been acquired it is then analyzed to determine certain working parameters to be used in carrying out the shading corrections. This analysis may be accomplished in a general purpose computer 16 and the output provided to a shading correction filter 20 which may be an image or other suitable processor.

FIG. 4.1 shows the sequence of steps to be followed in deriving parameters from the histogram for use in the shading correction techniques described in this application.

The first three steps in FIG. 4.1 involve calculation of the median (MED), minimum (MIN) and maximum (MAX) grayscale intensity levels in the image. The calculation of these parameters and the calculation of the background color may be carried out in various ways. The simplest technique would be to identify the background color with the extreme closest to the median, and this will work well for most images. However, experimental studies have shown that unless an image background can be clearly classified as black, it should be classified as white. This classification technique is shown in FIG. 4.2. For convenience, define WDIF as the difference between the white extreme (MAX) and the median (MED); also define BDIF as the difference between the median and the black extreme (MIN). For an image background to be classified as black, $2 \times BDIF$ should be less than WDIF.

After the background color is determined, another parameter, POORWHT, is derived which is used as a measure of the range of background intensities for which the shading correction requires sampling over a larger neighborhood as will be described. The procedure for determining POORWHT, shown in FIG. 4.3, is derived empirically. Similarly to define an acceptable background range R, we define DIF as the magnitude of the difference between the median and the background extreme. The lower limit of background intensities LN is set at MED-DIF, and the upper limit LP is MED+DIF (see FIG. 5.3). The total background range R is from LN to LP. If the background intensity range can be cleanly discriminated from foreground intensities, LN is set to 0 and LP is set at 31. This permits range R to be identified by 5 bits, as will be seen. POORWHT is then set to 2. All images classified as black background are automatically placed in this class. If the discrimination is not very good (WDIF≧2×BDIF), POORWHT is increased to 5, and if the discrimination is very poor (MIN≧MED−DIF). POORWHT is increased to 12. The intensity range from MIN to MIN+R×(POORWHT-1)/32) is defined as the background intensity range where the shading correction requires sampling over a larger neighborhood.

Once the background color has been identified and MED, DIF and POORWHT obtained from the histogram, the shading correction is preformed. Two embodiments will be described but first it should be understood that the shading correction methods and apparatus according to the present invention are based upon the following sampling concept. Gray scale values of the pels in a general neighborhood around a given pel in an image to be corrected are sampled. The samples must be far enough from the pel being corrected and from each other that any data related information content shows essentially no correlation between samples or with the pel being corrected. The samples should be closely enough spaced, however, that an accurate estimate of the low spatial frequency shading effects can be obtained. As a practical matter, samples should be taken at a radius distance from the given pel greater than the character size of the text data and perhaps in the range of 10 to 20 pel distances from that pel.

In a first embodiment of the invention a look-up table is constructed which remaps the original image to a correction image. Access is made to a look-up table which has as an input a multibit digital data signal representing the gray scale intensity value for one of a number of samples in the selected neighborhood around a given or current pel being corrected. The output from this look-up table is a signal representing the difference between the input intensity value of the neighboring pel being sampled and the medium previously calculated, except that if the difference value determined exceeds the permitted range R for background, as determined above, the corrective output of the look-up table for that current pel is set to zero, representing no correction made. In this embodiment of the invention, further samples are taken in the selected neighborhood point by point around the current pel to be corrected and the corrective outputs or correction terms generated by the look-up table are summed. An average value is obtained by dividing the sum of correction terms by the number of samples taken. This averaged correction value is used to correct the current pel intensity value for shading effects in shading correction filter 20. The shading corrected intensity value of the current pel is determined by the following equation:

$$X' = X + (M - A)$$

where
- X' is the corrected value of the current pel;
- X is the original value of the current pel;
- M is the median value; and
- A is the average value of the neighborhood background determined above, so that (M−A) is the average correction value for the neighborhood sample.

This creates a correction image which is the difference between the original image and the median for all pixels in the original image with intensities within the background range R. For all pixels in the original image at MIN or below in intensity, the correction image is zero.

Since the method set forth with respect to this embodiment determines an average background from a group of samples around the current pel, if samples are taken in an all black area such as off the edge of the frame, a skewed average will result causing an erroneous correction. Therefore, for pels in the band around the perimeter of the image, the average is taken including samples at the opposite edge of the image as if the image had been wrapped around so that the corresponding opposite edges were adjacent. Although this technique is an improvement over the prior art, there is still room for improvement since, for example, shading at the right and left edges of an image may not be the same due to external conditions.

Referring now to FIGS. 5.1–5.7, a second embodiment of the present invention which deals with the edge problem will now be described.

For purposes of explanation, a brief description of the Grinnell GMR-270 image processor will be given. The embodiment is not limited to this particular processor, however. The Grinnell GMR-270 image processor has four input look-up table (LUTs) each having an 8 bit input and 8 bit output. The eight input bits correspond to 256 different possible outputs. The 4 input LUTs are arranged in pairs to provide two 16 bit inputs to an arithmetic logic unit (ALU). The high order input tables provide the most significant 8 bits and the low order input tables provide the least significant 8 bits to their respective inputs. The output of the ALU is 16 bits and a carry bit. The 10 least significant bits of the ALU output can be fed to an output LUT which produces an 8 bit output. This output table therefore has 1024 input states, but only 256 unique output states. The ALU carry bit can be written to overlay bit planes. One of the overlays can be used to switch between two logical functions in the ALU. The other can be directed to the most significant input bit of the output LOT in place of the normal processor output to that input bit of the table.

Inputs to the image processor are obtained from several image buffers. In the description below two buffers will be used, one called the background image or reference (REF) buffer, and the other called the duplicate image or neighborhood buffer. Panning circuitry in the GMR-270 can be used to provide an offset between an image in the reference bufier and an image in the neighborhood buffer. Note that an additional buffer is used to keep a copy of the original image, as the images in both the neighborhood buffer and the reference buffer will be transformed during the development of the shading correction.

Referring again to FIGS. 5.1–5.7, the first step is to invert the image and parameter values if the background color is black. The sequence of steps to do this is shown in FIG. 5.2. The 'exclusive or' operation shown in FIG. 5.2 is equivalent to subtracting the value from 255. Inverting images with black backgrounds is desirable for the implementation in the Cronnell GMR-270, since neighborhood samples which would be taken from outside the image boundaries are forced to black in this implementation. Note that if the image is inverted before the shading correction is performed, it is reinverted after the shading correction is complete.

The six steps shown in FIG. 5.1 following the invert of background images are described in greater detail in FIGS. 5.3 through 5.7.

As is seen in FIG. 5.3, the upper and lower limits for background intensity, LP and LN, are calculated. A typical gray scale signal may have 8 bits representing 256 discrete gray scale levels ranging from white to black. The high order input tables are cleared to give zero output for all inputs, and a table is written to a low order input table to convert the image from its original 8 bit form to a 5 bit background intensity image. The reduction can conceptually be divided into three steps. First, the intensity range of the image is restricted to fall within the limits LN and LN and LP by clamping all pel intensities above LP to LP and all pel intensities below LN to LN. Next, the minimum intensity is reduced to zero by subtracting LN from the result of the first step. Finally, the dynamic range of the resulting image is scaled to the interval 0 to 31 (5 bits) by multiplying the intensity by 32/R. An example of a look-up table which will do this sequence as a single operation is shown in appended Table I. The reduction of the background intensity range to 5 bit representation is required only because of the signal path limitations of the particular image processor being used in the GMR-270.

The next step is the development of a background image which contains the maximum white value among a set of pels that includes the current pel being corrected and a sample of neighborhood pels in a small region around the current pel. FIG. 5.4 shows the steps required to set the LUTs for this operation. The first two steps in FIG. 5.4 set the LUTs for the neighborhood background image input. Both tables have as input the 5 bit neighborhood image. Their effect is to multiply the input image by 32. The high order LUT is shown in the top section of appended Table V, and the low order LUT is shown in the bottom section of Table V. Note that the first POORWHT entries (from 0 to POORWHT-1) in the top section have the most significant bit of the output set. The third step in FIG. 5.4 sets the LUTs for the reference image input. The high order table is zeroed except for the first POORWHT entries, where the table output is set to hex 80. The ALU will add the outputs of these two sets of input tables to create a composite 10 bit signal to feed to the output LUT. If both inputs are less than POORWHT, the addition of the two input signals in the ALU will set the carry.

The fourth step in FIG. 5.4 creates the output LUT. The function of this table is to compare the two 5 bit pel values and choose the larger of the two. Table I1 (appended) shows the look-up table transfer function for selecting a maximum while intensity value from the two inputs each of which have been mapped to five bit wide signals.

Once the LUTs have been set, the small neighborhood maxwhite selection is done. FIG. 5.5 is a flow chart of the steps. This maxwhite selection technique allows the sampling of a relatively large number of neighborhood pels in very few steps. The desired neighboring pel offset values are broken into short lists, with three offsets per list. For each offset in a given list a comparison is made between the neighborhood pel and the reference pel to select the maximum white. The comparison is done for all pels in the image and the result is stored in the reference image buffer, replacing the existing reference image. When the list is complete, the reference image contains the maximum white intensity among the four values sampled, i.e., the reference value and the three neighborhood values. The reference image is then copied to the neighborhood buffer and, if more is to be done, a new list is started. At the end of the first list the maximum white for each pel has been obtained from a sample of four pels. At the end of the second list the maximum white has been obtained from a sample of sixteen pels. In practice only two lists are processed, but if a third list of three offsets were processed the maximum white would be obtained from a sample of 64 pels. Note that after each comparison if both neighborhood and reference background images are in the POORWHT range the overlay bit is set.

A flow chart for the large neighborhood maxwhite selection is shown in FIG. 5.6. The LUTs are the same and the basic selection process is identical to the small neighborhood maxwhite selection, except that the offsets used are larger and only reference image pels where the bit in the overlay is set to flag a POORWHT background intensity are compared with the neighborhood pels. If after processing a given offset, an acceptable maximum white value is obtained, the bit is cleared in the overlay and the correction then remains unchanged for the rest of the large neighborhood offset values. If an acceptable maximum white value is not obtained, the process is iteratively repeated until a predetermined limit of incrations is achieved or an acceptable maximum white value is found.

At the end of the large neighborhood maxwhite selection the maximum white estimate for each pel is the result of comparison of up to eighty different pels—the original reference pel and up to 79 neighbors in the vicinity of the reference pel. The comparison is obtained, however, with a relatively small number of processing steps. Note that for pels near the edges and corners of the image the sample size is smaller. All samples taken outside the image are black, and therefore are rejected by the maximum white comparison process. However, since the sample size is still large, the probability of a bad correction value near edges and corners in extremely small.

After the maximum white estimate is obtained, a filtering is achieved by summing three nearest neighbor intensity values with the current pel. The summation is replaced by a multiply by four at the edges of the image in accordance with the overlay control described above. FIG. 5.7 contains the flow chart for this filtering operation.

In operation, a mask is set in two separate overlay planes wherein the mask applies to the entire image if set to the "off" condition and to the band of pels around the perimeter of the image if set to the "on" condition. During normal processing of pels in the center of the image, the first overlay plane is set "off", causing the processor to sum the reference pel with the neighborhood pel. For pels in the edge band around the perimeter, the first overlay is set "on", inhibiting summation and leaving the reference pel intact for the first two summations over all pels in the image.

The second overlay plane controls the output LUT opertion. When the third and final summation is made, the second overlay is fed to the most significant bit of the processor output LUT. If the overlay bit is set "off", a portion of the output LUT is selected which transfers the ALU output without change to the reference buffer. If the overlay bit is set "on", the multiply by four table shown in (appended) Table III is selected, and the input is multiplied by four before storage in the reference buffer. This technique greatly reduces the effect of edges on this filtering operation.

The result of the steps described in FIG. 5.7 is a smooth background intensity image having values from 0 to 127. The summation process averages any noise produced by the maximum white selection process.

As shown in FIG. 5.1, the background intensity image must now be remapped to a correction value, using a table which rescales the background image to the correct dynamic range and shifts the zero correction point to correspond to the median. Table IV (appended) gives an example of the low order and high order input LUTs required for this remapping. The background image as interpreted by this table, is added to the original image. The result, clamped to the range from 0 to 255, is the shading corrected image.

The nonlinear shading filter described above provides a variable pass band filtering by enabling lower pass band whenever the correction derived from earlier operation indicates a failure of the correction together with noise averaging as a final step with lock out of the averaging at the borders of the image.

It will be seen therefore that apparatus and methods have been presented for simply and effectively correcting for shading effects in video images particularly in graphics form.

For convenience, a specific example of basic code that can be used with the disclosed apparatus for histogram analysis and shading correction is appended.

TABLE I

| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | 0000 | 0000 | 0000 | 0000 | 0000 | 0000 | 0001 |
| 0202 | 0304 | 0505 | 0607 | 0808 | 090a | 0b0b | 0c0d |
| 0e0e | 0f10 | 1112 | 1213 | 1415 | 1516 | 1718 | 1819 |
| 1a1b | 1b1c | 1d1e | 1e1f | 1f1f | 1f1f | 1f1f | 1f1f |
| 1f1f | 1f1f | 1f1f | 1f1f | 1f1f | 1f1f | 1f1f | 1f1f |
| 1f1f | 1f1f | 1f1f | 1f1f | 1f1f | 1f1f | 1f1f | 1f1f |
| 1f1f | 1f1f | 1f1f | 1f1f | 1f1f | 1f1f | 1f1f | 1f1f |
| 1f1f | 1f1f | 1f1f | 1f1f | 1f1f | 1f1f | 1f1f | 1f1f |
| 1f1f | 1f1f | 1f1f | 1f1f | 1f1f | 1f1f | 1f1f | 1f1f |
| 1f1f | 1f1f | 1f1f | 1f1f | 1f1f | 1f1f | 1f1f | 1f1f |
| 1f1f | 1f1f | 1f1f | 1f1f | 1f1f | 1f1f | 1f1f | 1f1f |

TABLE II

| 0001 | 0203 | 0405 | 0607 | 0809 | 0a0b | 0c0d | 0e0f |
| 1011 | 1213 | 1415 | 1617 | 1819 | 1a1b | 1c1d | 1e1f |
| 0101 | 0203 | 0405 | 0607 | 0809 | 0a0b | 0c0d | 0e0f |
| 1011 | 1213 | 1415 | 1617 | 1819 | 1a1b | 1c1d | 1e1f |
| 0202 | 0203 | 0405 | 0607 | 0809 | 0a0b | 0c0d | 0e0f |
| 1011 | 1213 | 1415 | 1617 | 1819 | 1a1b | 1c1d | 1e1f |

TABLE II-continued

| | | | | | | | |
|---|---|---|---|---|---|---|---|
| 0303 | 0303 | 0405 | 0607 | 0809 | 0a0b | 0c0d | 0e0f |
| 1011 | 1213 | 1415 | 1617 | 1819 | 1a1b | 1c1d | 1e1f |
| 0404 | 0404 | 0405 | 0607 | 0809 | 0a0b | 0c0d | 0e0f |
| 1011 | 1213 | 1415 | 1617 | 1819 | 1a1b | 1c1d | 1e1f |
| 0505 | 0505 | 0505 | 0607 | 0809 | 0a0b | 0c0d | 0e0f |
| 1011 | 1213 | 1415 | 1617 | 1819 | 1a1b | 1c1d | 1e1f |
| 0606 | 0606 | 0606 | 0607 | 0809 | 0a0b | 0c0d | 0e0f |
| 1011 | 1213 | 1415 | 1617 | 1819 | 1a1b | 1c1d | 1e1f |
| 0707 | 0707 | 0707 | 0707 | 0809 | 0a0b | 0c0d | 0e0f |
| 1011 | 1213 | 1415 | 1617 | 1819 | 1a1b | 1c1d | 1e1f |
| 0808 | 0808 | 0808 | 0808 | 0809 | 0a0b | 0c0d | 0e0f |
| 1011 | 1213 | 1415 | 1617 | 1819 | 1a1b | 1c1d | 1e1f |
| 0909 | 0909 | 0909 | 0909 | 0909 | 0a0b | 0c0d | 0e0f |
| 1011 | 1213 | 1415 | 1617 | 1819 | 1a1b | 1c1d | 1e1f |
| 0a0a | 0a0a | 0a0a | 0a0a | 0a0a | 0a0b | 0c0d | 0e0f |
| 1011 | 1213 | 1415 | 1617 | 1819 | 1a1b | 1c1d | 1e1f |
| 0b0b | 0b0b | 0b0b | 0b0b | 0b0b | 0b0b | 0c0d | 0e0f |
| 1011 | 1213 | 1415 | 1617 | 1819 | 1a1b | 1c1d | 1e1f |
| 0c0c | 0c0c | 0c0c | 0c0c | 0c0c | 0c0c | 0c0c | 0e0f |
| 1011 | 1213 | 1415 | 1617 | 1819 | 1a1b | 1c1d | 1e1f |
| 0d0d | 0d0d | 0d0d | 0d0d | 0d0d | 0d0d | 0d0d | 0e0f |
| 1011 | 1213 | 1415 | 1617 | 1819 | 1a1b | 1c1d | 1e1f |
| 0e0e | 0e0e | 0e0e | 0e0e | 0e0e | 0e0e | 0e0e | 0e0f |
| 1011 | 1213 | 1415 | 1617 | 1819 | 1a1b | 1c1d | 1e1f |
| 0f0f | 0f0f | 0f0f | 0f0f | 0f0f | 0f0f | 0f0f | 0f0f |
| 1011 | 1213 | 1415 | 1617 | 1819 | 1a1b | 1c1d | 1e1f |
| 1010 | 1010 | 1010 | 1010 | 1010 | 1010 | 1010 | 1010 |
| 1011 | 1213 | 1415 | 1617 | 1819 | 1a1b | 1c1d | 1e1f |
| 1111 | 1111 | 1111 | 1111 | 1111 | 1111 | 1111 | 1111 |
| 1111 | 1213 | 1415 | 1617 | 1819 | 1a1b | 1c1d | 1e1f |
| 1212 | 1212 | 1212 | 1212 | 1212 | 1212 | 1212 | 1212 |
| 1212 | 1213 | 1415 | 1617 | 1819 | 1a1b | 1c1d | 1e1f |
| 1313 | 1313 | 1313 | 1313 | 1313 | 1313 | 1313 | 1313 |
| 1313 | 1313 | 1415 | 1617 | 1819 | 1a1b | 1c1d | 1e1f |
| 1414 | 1414 | 1414 | 1414 | 1414 | 1414 | 1414 | 1414 |
| 1414 | 1414 | 1415 | 1617 | 1819 | 1a1b | 1c1d | 1e1f |
| 1515 | 1515 | 1515 | 1515 | 1515 | 1515 | 1515 | 1515 |
| 1515 | 1515 | 1515 | 1617 | 1819 | 1a1b | 1c1d | 1e1f |
| 1616 | 1616 | 1616 | 1616 | 1616 | 1616 | 1616 | 1616 |
| 1616 | 1616 | 1616 | 1617 | 1819 | 1a1b | 1c1d | 1e1f |
| 1717 | 1717 | 1717 | 1717 | 1717 | 1717 | 1717 | 1717 |
| 1717 | 1717 | 1717 | 1717 | 1819 | 1a1b | 1c1d | 1e1f |
| 1818 | 1818 | 1818 | 1818 | 1818 | 1818 | 1818 | 1818 |
| 1818 | 1818 | 1818 | 1818 | 1819 | 1a1b | 1c1d | 1e1f |
| 1919 | 1919 | 1919 | 1919 | 1919 | 1919 | 1919 | 1919 |
| 1919 | 1919 | 1919 | 1919 | 1919 | 1a1b | 1c1d | 1e1f |
| 1a1a | 1a1a | 1a1a | 1a1a | 1a1a | 1a1a | 1a1a | 1a1a |
| 1a1a | 1a1a | 1a1a | 1a1a | 1a1a | 1a1b | 1c1d | 1e1f |
| 1b1b | 1b1b | 1b1b | 1b1b | 1b1b | 1b1b | 1b1b | 1b1b |
| 1b1b | 1b1b | 1b1b | 1b1b | 1b1b | 1b1b | 1c1d | 1e1f |
| 1c1c | 1c1c | 1c1c | 1c1c | 1c1c | 1c1c | 1c1c | 1c1c |
| 1c1c | 1c1c | 1c1c | 1c1c | 1c1c | 1c1c | 1c1d | 1e1f |
| 1d1d | 1d1d | 1d1d | 1d1d | 1d1d | 1d1d | 1d1d | 1d1d |
| 1d1d | 1d1d | 1d1d | 1d1d | 1d1d | 1d1d | 1d1d | 1e1f |
| 1e1e | 1e1e | 1e1e | 1e1e | 1e1e | 1e1e | 1e1e | 1e1e |
| 1e1e | 1e1e | 1e1e | 1e1e | 1e1e | 1e1e | 1e1e | 1e1f |
| 1f1f | 1f1f | 1f1f | 1f1f | 1f1f | 1f1f | 1f1f | 1f1f |
| 1f1f | 1f1f | 1f1f | 1f1f | 1f1f | 1f1f | 1f1f | 1f1f |

TABLE III

| | | | | | | | |
|---|---|---|---|---|---|---|---|
| 0004 | 080c | 1014 | 181c | 2024 | 282c | 3034 | 383c |
| 4044 | 484c | 5054 | 585c | 6064 | 686c | 7074 | 787c |
| 8084 | 888c | 9094 | 989c | a0a4 | a8ac | b0b4 | b8bc |
| c0c4 | c8cc | d0d4 | d8dc | e0e4 | e8ec | f0f4 | f8fc |
| 0104 | 090c | 1114 | 191c | 2124 | 292c | 3134 | 393c |
| 4144 | 494c | 5154 | 595c | 6164 | 696c | 7174 | 797c |
| 8184 | 898c | 9194 | 999c | a1a4 | a9ac | b1b4 | b9bc |
| c1c4 | c9cc | d1d4 | d9dc | e1e4 | e9ec | f1f4 | f9fc |
| 0204 | 0a0c | 1214 | 1a1c | 2224 | 2a2c | 3234 | 3a3c |
| 4244 | 4a4c | 5254 | 5a5c | 6264 | 6a6c | 7274 | 7a7c |
| 8284 | 8a8c | 9294 | 9a9c | a2a4 | aaac | b2b4 | babc |
| c2c4 | cacc | d2 | dadc | e2e4 | eaec | f2f4 | fafc |
| 0304 | 0b0c | 1314 | 1b1c | 2324 | 2b2c | 3334 | 3b3c |
| 4344 | 4b4c | 5354 | 5b5c | 6364 | 6b6c | 7374 | 7b7c |
| 8384 | 8b8c | 9394 | 9b9c | a3a4 | abac | b3b4 | bbbc |
| c3c4 | cbcc | d3d4 | dbdc | e3e4 | ebec | f3f4 | fbfc |

TABLE IV

| | | | | | | | |
|---|---|---|---|---|---|---|---|
| 1414 | 1413 | 1313 | 1212 | 1211 | 1111 | 1010 | 100f |
| 0f0f | 0e0e | 0e0d | 0d0d | 0c0c | 0c0b | 0b0b | 0a0a |
| 0a09 | 0909 | 0808 | 0807 | 0707 | 0606 | 0605 | 0505 |
| 0404 | 0403 | 0303 | 0202 | 0201 | 0101 | 0000 | 0000 |
| ffff | fffe | fefe | fdfd | fdfc | fcfc | fbfb | fbfa |
| fafa | f9f9 | f9f8 | f8f8 | f7f7 | f7f6 | f6f6 | f5f5 |
| f5f4 | f4f4 | f3f3 | f3f2 | f2f2 | f1f1 | f1f0 | f0f0 |
| efef | efee | eeee | eded | edec | ecec | ebeb | ebeb |
| ebeb | ebeb | ebeb | ebeb | ebeb | ebeb | ebeb | ebeb |
| ebeb | ebeb | ebeb | ebeb | ebeb | ebeb | ebeb | ebeb |
| ebeb | ebeb | ebeb | ebeb | ebeb | ebeb | ebeb | ebeb |
| ebeb | ebeb | ebeb | ebeb | ebeb | ebeb | ebeb | ebeb |
| ebeb | ebeb | ebeb | ebeb | ebeb | ebeb | ebeb | ebeb |
| ebeb | ebeb | ebeb | ebeb | ebeb | ebeb | ebeb | ebeb |
| ebeb | ebeb | ebeb | ebeb | ebeb | ebeb | ebeb | ebeb |

Sign Bit for Remapping to True Correction

| | | | | | | | |
|---|---|---|---|---|---|---|---|
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | 0000 | 0000 | 0000 | 0000 | 0000 | 0000 | 0000 |
| 0000 | 0000 | 0000 | 0000 | 0000 | 0000 | 0000 | 0000 |
| 0f0f | 0f0f | 0f0f | 0f0f | 0f0f | 0f0f | 0f0f | 0f0f |
| 0f0f | 0f0f | 0f0f | 0f0f | 0f0f | 0f0f | 0f0f | 0f0f |
| 0f0f | 0f0f | 0f0f | 0f0f | 0f0f | 0f0f | 0f0f | 0f0f |
| 0f0f | 0f0f | 0f0f | 0f0f | 0f0f | 0f0f | 0f0f | 0f0f |
| 0f0f | 0f0f | 0f0f | 0f0f | 0f0f | 0f0f | 0f0f | 0f0f |
| 0f0f | 0f0f | 0f0f | 0f0f | 0f0f | 0f0f | 0f0f | 0f0f |
| 0f0f | 0f0f | 0f0f | 0f0f | 0f0f | 0f0f | 0f0f | 0f0f |
| 0f0f | 0f0f | 0f0f | 0f0f | 0f0f | 0f0f | 0f0f | 0f0f |
| 0f0f | 0f0f | 0f0f | 0f0f | 0f0f | 0f0f | 0f0f | 0f0f |
| 0f0f | 0f0f | 0f0f | 0f0f | 0f0f | 0f0f | 0f0f | 0f0f |
| 0f0f | 0f0f | 0f0f | 0f0f | 0f0f | 0f0f | 0f0f | 0f0f |

TABLE V

| | | | | | | | |
|---|---|---|---|---|---|---|---|
| 8080 | 8080 | 8080 | 8000 | 0101 | 0101 | 0101 | 0101 |
| 0202 | 0202 | 0202 | 0202 | 0303 | 0303 | 0303 | 0303 |
| 0404 | 0404 | 0404 | 0404 | 0505 | 0505 | 0505 | 0505 |
| 0606 | 0606 | 0606 | 0606 | 0707 | 0707 | 0707 | 0707 |
| 0808 | 0808 | 0808 | 0808 | 0909 | 0909 | 0909 | 0909 |
| 0a0a | 0a0a | 0a0a | 0a0a | 0b0b | 0b0b | 0b0b | 0b0b |
| 0c0c | 0c0c | 0c0c | 0c0c | 0d0d | 0d0d | 0d0d | 0d0d |
| 0e0e | 0e0e | 0e0e | 0e0e | 0f0f | 0f0f | 0f0f | 0f0f |
| 1010 | 1010 | 1010 | 1010 | 1111 | 1111 | 1111 | 1111 |
| 1212 | 1212 | 1212 | 1212 | 1313 | 1313 | 1313 | 1313 |
| 1414 | 1414 | 1414 | 1414 | 1515 | 1515 | 1515 | 1515 |
| 1616 | 1616 | 1616 | 1616 | 1717 | 1717 | 1717 | 1717 |
| 1818 | 1818 | 1818 | 1818 | 1919 | 1919 | 1919 | 1919 |
| 1a1a | 1a1a | 1a1a | 1a1a | 1b1b | 1b1b | 1b1b | 1b1b |
| 1c1c | 1c1c | 1c1c | 1c1c | 1d1d | 1d1d | 1d1d | 1d1d |
| 1e1e | 1e1e | 1e1e | 1e1e | 1f1f | 1f1f | 1f1f | 1f1f |
| 0020 | 4060 | 80a0 | c0e0 | 0020 | 4060 | 80a0 | c0e0 |
| 0020 | 4060 | 80a0 | c0e0 | 0002 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |
| 0020 | 4060 | 80a0 | c0e0 | 0020 | 4060 | 80a0 | c0e0 |

PREFERRED EMBODIMENT OF HISTOGRAM ANALYSIS AND SHADING CORRECTION FILTER IMPLEMENTATION FOR A GMR-270 function hstgr;

(process histogram of image to derive values for the maximum, minimum and median. Determine the background color of the image and the range of background values which would probably be considered bad in the sampling process for the shading correction. Histogram data is stored in embduf. A 480×512 pixel image requires 18 bit precision for the histogram data. To avoid edge effects, the histogram is obtained for a 472×504 pixel area centered in the middle of the 480×512 image. The high order 16 bits of the histogram data are in the 1st 256 half words, the low order 16 bits are in the next 256 half words. A half word is defined to be 16 bits. All variables referenced in this code are half words in storage or 16 bit registers.)

half hgh(base b1) hg1(base b1+512);

(First calculate the median. The 1st 256 words contain the high order 16 bits. Sum these, ignoring loss of precision of the least significant 2 bits)

```
nr=472                      (height of data for histogram)
nc=504                      (width of data for histogram)
tvar0=srl nr 1              (number of rows in image/2)
b2=expl srl nc 2            (number of columns in image/4)
b2=expl * tvar0 expl b2     (b2 is nc*nr/8)
b1=addr cmdbuf              (set to bottom of histogram data)
bsub1=b1                    (save bottom)
b1=+b1 510                  (point to top of histogram data)
b0=0                        (zero sum)
begin                       (sum over hgh from top down)
b0=+ b0 expl hgh
if b2 lgt b0
b1=- b1 2
repeat
endif
endbegin
if b1 1lt bsub1
b1=bsub1
endif
med=expl srl expl - b1 expl bsub1 1
b1=addr cmdbuf
blim1=b1
(zero total state cnt)
b0=0                        (use for low order part of sum)
(get min level - sum from bottom up)
begin
b0=+ b0 expl hgh            (sum hgh)
if b0 1lt 32
b1=+ b1 2
repeat
endif
endbegin
(now count down til 1st zero found)
begin
if hg1>0
if b1 lgt blim1
b1=- b1 2
repeat
endif
endif
endbegin
min= srl expl - b1 expl blim1 1
(now get max level - sum from top down)
blim1=+ blim1 510           (point to top of histogram data)
b1=blim1
b0=0                        (low order word of sum)
begin
b0=+ b0 expl hgh            (sum hgh)
if b0 1lt 32
b1=- b1 2
repeat
endif
endbegin
(now go up til 1st zero encountered)
begin
if hg1>0
if b1 1lt blim1
b1=+ b1 2
repeat
endif
endif
endbegin
max=expl srl expl - b1 - expl blim1 510 1
dif=- med min               (black dif)
```

-continued

```
if s11 dif 1 < - max med   (if image is clearly white
                            on black bkgnd)
color=0                    (white on black background)
else                       (image was prob black on
                            white background)
(black dif must be twice white dif for clean graphics images)
color=1
dif=- max med              (white dif)
endif
poorwht=2                  (init for clean graphics image)
if color=1                 (white background)
dif=- max med              (recalc in case grayscale image)
if -med min < s11 dif 1    (check for low dynamic
                            range/gray scale)
poorwht=7                  (low pass shading correction
                            more often)
endif
if min > -med dif          (really low dynamic range/gray scale)
poorwht=12                 (do low pass still more often)
endif
endif endfn
``` function deshade;

(Note: This implementation of the shading correction algorithin is explicitly for the Grinnell GMR-270 image processor.

This image processor consists of a 16 bit ALU with two 16 bit input paths. Data from image memories is fed through four 8×8 lookup tables (tables 0 and 1 feed one input of the ALU, and tables 2 and 3 feed the other). The low order 10 bits of the output can be fed through a 10×8 output table (table 4) if desired. The processor also allows one to select between two different ALU functions based on a select bit from a one bit/pixel memory called overlay 8. Either the most significant bit or the carry bit of the processor can be written to overlay 8. For processor operations 3 image memories, mem0, mem6 and mem7, can be used. Mem0 can be panned to address neighboring pixels.

Correct for shading of the vidoo image as follows:

1. Image is in mem0,6 and 7 at start. All processor tables are 1:1, but overlay 8:8 is still net. If color=0, invert in 0,7. Write look up table for med-video dit (5 bit output) with min white=0, max white—31, allowable white range med/-dif. Remap image to 5 bit dit in 0,6. Reset tables. Write table 4 to select maxwhite between two pixels.

2. Do neighborhood convolution to select maxwhite for block 4 pixels. Write overlay 8 wherever maxwhite values are both small. Final step of convolution will leave overlay 8 set where maxwhite selection did not work for any neighbor tried. Copy maxwhite to mem0 and repeut to get maxwhite for 16 pixels round current pixel. Copy result to mem0 when convolution complete.

3. Do large neighborhood convolution for pixels where the small neighborhood convolution gives a poor shading correction. 'poorwht' defines the number of white states (out of 32) which are in the 'poor' category. 'poorwht' is set in hstgr; for clearly black/white images it is 2, for images which have some range of grays it is 7, and for images which have the histogram of a grayscale image it is 12. Erase overlay 8 when doing the final image move to set up for step 4.

4. Sum maxwhite for 4 pixels—3 nearest neighbors and current pixel—except at edge of image. Feed result to lookup table to get shading correction.

5. Now correct image by adding correction to video. Return result to mem0,6. Invert in 0 if needed.)

```
based b0
half bufptr bufptr2 bufptr4 bufptr6 bufptr8 bufptr10
bufptr12 bufptr14 bufptr16 bufptr18 bufptr20 bufptr22
bufptr24 bufptr26 bufptr28 bufptr30;
half xd(base b2) yd(base b2+12) md(base b2+24);
static
half xs(6) ys(6) ms(6) xl(6) yl(6) ml(6) xf(6) yf(6) mf(6);
init xs      _2   _1    2    2   _4    1    5;  (x,y,ms for maxwhite selection)
init ys       2   _2    1   _2   _5    3;
init ms       0    0    1    0    0    2;  (copy 6 to 0 if ms=1, exit if ms=2)
init xl     _28  _12   60   28    0    0;  (x,y,ml for low pass maxwhite)
init yl      44  _52   _4  _32    0    0;
init ml       0    0    0    1    0    0;
init xf       1   _1    0    0    0    0;  (x,y,mf for final averaging)
init yf      _1   _1    1    0    0    0;
init mf       0    0    1    1    1    1;  (exit when mf--=0)
b0=addr cmdbuf
b0st=b0
if color=0
tvar0=eor 255 max       (note that inversion interchanges max and min)
med=eor 255 med         (invert median, maximum and minimum)
max=eor 255 min
min=tvar0
bufptr  = hex a010
bufptr2 = hex c800      (mem0 to 0,1,2,3)
bufptr4 = hex ca00      (deselect tbl4)
bufptr6 = hex cc36      (clamp 2,3, invert 0,1)
bufptr8 = hex 8081      (enable 0,7)
bufptr10= hex c000      (write the inverted image to 0,7)
bufptr12= hex a001      (select video driver)
bufptr14= hex ca28      (invert image display to outputs a,c)
b0= +b0 16
endif
zerotbl 5               (tbl0,2: zero high order input tables)
shdtbl5                 (tbl1: 5 bit white covering
                         range med+/-dif)
bufptr  = hex a001      (select video driver, pcr bit0 only)
bufptr2 = hex c837      (video a from 7, b from 3, c from 7)
bufptr4 = hex a010
bufptr6 = hex c800
bufptr8 = hex ca30      (tbl4 on, carry to overlay)
bufptr10= hex cc34      (mem0 only, thru tbl 1)
bufptr12= hex 8341      (enable mem0,6,8,9)
bufptr14= hex c000      (5 bit white to mem0,6, clear overlays 8,9)
b0= +b0 16
(set up for convolution with nearest neighbors)
mtable 1 _3             (tbl0: shift high order input down 3 bits)
setbits                 (set bits to flag poor white values)
mtable 2 5              (tbl1: shift low order input up 5 bits)
zerotbl 4               (tbl2: zeroed)
setbits                 (set bits to flag poor white values)
mxwhite4                (tbl4: table to select maximum white)
(tbl3 is still 1:1)
b2=b9
rtn-=writgl b0st expl -b0 b0st 0 rcadd (write instructions to Grinnell)
if rtn-=0 stop - sl1 color 1 1 endif
(Select max white for 5 bit states in mem0, mem6 via convolution)
b0=b0st
b2=addr xs
begin                   (high-pass maxwhite selection)
bufptr  = hex a008      (select zoom and pan)
bufptr2 = hex b000      (point to x offset)
bufptr4 = hex c00c      (pan enabled, zoom=1,
                         blanking at edge)
bufptr6 = +hex d0ff xd  (set x offset)
bufptr8 = +hex d0ff yd  (set y offset)
bufptr10= hex a010      (select processor)
bufptr12= hex c8f0      (mem0 to tbls 0,1; mem6 to tbls 2,3)
bufptr14= hex ca30      (tbl4 on, carry to overlay)
bufptr16= hex cc30      (add maxwhite to shifted maxwhite)
bufptr18= hex 8140      (enable mem6, overlay 8)
bufptr20= hex c000      (write to mem6, overlay 8)
b0= +b0 22
if md= 0                (repeat operation with new neighbor)
b2=+ b2 2
repeat
else                    (copy maxwhite in mem6 to mem0)
bufptr  = hex a008      (select zoom and pan)
bufptr2 = hex c000      (disable zoom and pan)
bufptr4 = hex a040      (enable digitizer 0)
bufptr6 = hex 8001      (select mem0)
bufptr8 = hex c80f      (input from 6, camera input zeroed)
```

-continued

```
bufptr10= hex d200      (copy 6 to 0)
b0= +b0 12
if md=1
b2=+ b2 2
repeat                  (repeat until md=2)
endif
endif
endbegin                (leave loop when md=2)
b2=addr xl
begin                   (low-pass maxwhite selection)
bufptr = hex a008       (select zoom and pan)
bufptr2 = hex b000      (point to x offset)
bufptr4 = hex c00c      (pan enabled, zoom=1,
                         blanking at edge)
bufptr6 = +hex d0ff xd  (set x offset)
bufptr8 = +hex d0ff yd  (set y offset)
bufptr10= hex a010      (select processor)
bufptr12= hex c8f0      (mem0 to tbls 0,1; mem6 to tbls 2,3)
bufptr14= hex call      (tbl4 on, processor toggling on)
bufptr16= hex cc31      (keep maxwhite as-is if overlay 8 not set)
bufptr18= hex ce30      (add maxwhite to shifted
                         maxwhite if ovly set)
bufptr20= hex 8040      (enable mem6)
bufptr22= hex c000      (write to mem6)
b0= +b0 24
if md= 0
b2=+ b2 2
repeat
endif
endbegin                (leave loop when md--=0)
b2=b9
rtn--=writgl b0st expl -b0 b0st 0 rcadd  (write instructions to Grinnell)
if rtn--=0 stop - s11 color 1 1 endif
b0=b0st
zerotbl 5               (zero high order input tables)
(move image from mem6 to mem0, clearing overlay 8 as well)
bufptr = hex a008       (select zoom and pan)
bufptr2 = hex c000      (disable zoom and pan)
bufptr4 = hex a010      (select processor)
bufptr6 = hex c8ff      (mem6 to tbls 0,1,2,3)
bufptr8 = hex ca30      (tbl4 on, carry to output)
bufptr10= hex cc31      (add, clamp 0,1)
bufptr12= hex 8101      (enable mem0, overlay 8)
bufptr14= hex c000      (copy 6 to 0, clear overlay 8)
b0= +b0 16
tbl121 hex 1a           (make tbls 1,3 1st 1/4 of tbl4 1:1)
shdtblx4                (3rd quadrant of tbl 4x for border pixels)
(set overlay masks to block averaging of edge pixels)
bufptr = hex 8300       (select overlays 8,9)
bufptr2 = hex 1300      (select subchannels 8,9)
bufptr4 = hex 2800      (set normal write mode)
bufptr6 = hex 4800      (Ea=0)
bufptr8 = hex 51ff      (Eb=511)
bufptr10= hex 6800      (La=0)
bufptr12= hex 7400      (Lb=0, write bottom line of masks)
bufptr14= hex 4800      (Ea=0)
bufptr16= hex 51ff      (Eb=511)
bufptr18= hex 69df      (La=479)
bufptr20= hex 7400      (Lb=0, write top line of masks)
bufptr22= hex 4800      (Ea=0)
bufptr24= hex 5000      (Eb=0)
bufptr26= hex 6800      (La=0)
bufptr28= hex 75df      (Lb=479, write left side of masks)
b0=+b0 30
bufptr = hex 49ff       (Ea=511)
bufptr2 = hex 5000      (Eb=0)
bufptr4 = hex 6800      (La=0)
bufptr6 = hex 75df      (Lb=479, write right side of masks)
b0=+b0 8
b2=addr xf
begin                   (average 4 maxwhite values,
                         keep edge as-is)
bufptr = hex a008       (select zoom and pan)
bufptr2 = hex b000      (point to x offset)
bufptr4 = hex c00c      (pan enabled, zoom=1,
                         blanking at edge)
bufptr6 = +hex d0ff xd  (set x offset)
bufptr8 = +hex d0ff yd  (set y offset)
bufptr10= hex a010      (select processor)
bufptr12= hex c8f0      (mem0 to tbls 0,1; mem6 to tbls 2,3)
bufptr14= hex cc30      (add if overlay not set)
bufptr16= hex ce31      (2,3 only if overlay set, no averaging)
```

-continued

```
if md=0
bufptr18= hex call      (tbl4 on, proc tog on, tbl tog off)
bufptr20= hex 8040      (enable mem6)
bufptr22= hex c000      (write to mem6, overlay 8)
b0= +b0 24
b2= +b2 2
repeat
else                    (sum of 4 maxwhite, normalize
                         edges to 4x)
bufptr18= hex ca35      (tbl4 on, proc & tbl tog on, carry to ovly)
bufptr20= hex 8340      (enable mem6, ovly 8.8 & 9.9)
bufptr22= hex c000      (write to mem6, clear overlays)
b0= +b0 24
endif
endbegin
(now rebuild max white via tbls 0,1. Original image in 7, shading
correction in 6. Tbl3 still 1:1, tbl 2 zeroed)
shdtblx                 (maxwhite to shading correction in 0,1)
clip4                   (tbl4 1:1 for real video input range)
bufptr  = hex a008      (select zoom and pan)
bufptr2 = hex c000      (disable zoom and pan)
bufptr4 = hex a010      (select processor)
bufptr6 = hex c8ff      (mem6 to 0,1)
bufptr8 = hex cad0      (mem7 to 2,3, tbl4 selected)
bufptr10= hex cc30      (add 0,1 to 2,3)
bufptr12= hex 80c1      (mem0,6,7 enabled)
bufptr14= hex c000      (write to mem0,6; clear mem7)
bufptr16= hex a001      (select video driver)
bufptr18= hex c804      (restore output a,c to mem0)
b0= +b0 20
tbl121 hex 0f           (all input tables 1:1)
if color=0
tvar0= eor 255 max      (note inversion interchanges max, min)
med= eor 255 med
max= eor 255 min
min= tvar0
bufptr  = hex a010      (select processor)
bufptr2 = hex c800      (mem0 to 0,1,2,3)
bufptr4 = hex ca00      (deselect tbl4)
bufptr6 = hex cc36      (clamp 2,3, invert 0,1)
bufptr8 = hex 8041      (enable mem0,6)
bufptr10= hex c000      (write the inverted image to C,6)
bufptr12= hex a001      (select video driver0)
bufptr14= hex ca00      (restore normal output from inverted)
b0= +b0 16
endif
b2=b9
rtn =writgl b0st expl -b0 b0st 0 rcadd(write instructions to Grinnell)
if rtn--=0 stop 0 endif   (end of shading correction
endfn
function)
function setbits;
('or' first poorwht table values with hex 80 to flag low intensities)
bsub0=b0                (save instruction pointer)
b0= -b0 258             (back up to start of table)
b1= +b0 expl poorwht    (set limit for loop)
begin                   (set msbs for poorwht entries)
if b0 llt b1
bytptr=                 o bytptr hex 80
b0= +b0 1
repeat
endif
endbegin
b0=bsub0                (restore instruction pointer) endfn
function shdtbl5;
(Generate table for median-video, limited to a maximum of dif and
scaled to fit in 5 bits. Offset table output such that min white
is 0, max white is 31. Generate in packed form.)
bufptr =hex a010        (select processor)
bufptr2=hex c222        (write to table 1)
bufptr4=hex b000        (zero address counter)
bufptr6=hex a210        (select byte unpacking too)
bufptr8=hex c480        (download 256 packed bytes)
b0= + b0 10
ln= -med dif            (min limit)
lp= +med dif            (max limit)
if ln>0                 (zero output to video input of ln)
zero b0 expl ln
b0= + b0 expl ln
endif
b1=expl srl dif 1
b2=0
```

```
b3=0
begin
if b2>b1
b1=+ b1 expl dif          (incr in steps of dif)
if b3<31                   (limit b3 to 5 bits or less)
b3=+ b3 1
endif
endif
bytptr=expl b3
b2=+ b2 16                (incr in steps of 16 equiv to
                           incr of 1n by (1)
b0=+ b0 1
if 1n<1p
1n=+ 1n 1
repeat
endif
endbegin
if 1p<255
fill b0 31 expl −255 1p   (fill at b0 with 31 for 225- 1p bytes)
b0=+ b0 expl −255 1p
else
b0=− b0 expl −1p 255      (back up if any overshoot)
endif
bufptr = hex a010          (deselect byte unpacking)
b0=+ b0 2 endfn
``` function mxwhite4;
(Write 10×8 max white select table to processor table 4. The two white values are in the low and high 5 bit sections of the input, unsigned, with values 0 to 31, each. Write out in packed form.)

```
static
byte datatbl(32);
init datatbl
0 1 2 3 4 5 6 7 8 9 10 11 12 13 14 15
16 17 18 19 20 21 22 23 24 25 26 27 28 29 30 31;
bufptr =hex a010          (select processor)
bufptr2=hex c230          (select table 4)
bufptr4=hex b000          (zero address counter)
bufptr6=hex a210          (select bytepacking)
bufptr8=hex c400          (download 512 bytes in packed form)
b0=+ b0 10
bsub0=b0
b1=b0
b2=addr datatbl
copy b0 b2 32             (copy initial buffer)
b0=+b0 32
copy b0 b2 32             (twice)
b0=+b0 32
b2=bsub0
copy b0 b2 64             (replicate 1st 64)
b0=+b0 64
copy b0 b2 128            (replicate 1st 128)
b0=+b0 128
copy b0 b2 256            (complete 1st 512 table entries)
b0=+bsub0 32              (back up b0 to 1st fill point)
(b0 points to fill area in loop)
b1=1                      (counter for high order white)
begin                     (do 1st half of table4)
fill b0 expl b1 expl b1   (fill in b1 for b1 entries)
b0=+b0 32
b1=+ b1 1
if b1<16
repeat
endif
endbegin
bufptr=hex c400           (download 256 words in packed form)
b0=+ b0 2
copy b0 bsub0 512         (copy 1st half of table to 2nd half)
begin                     (do 2nd half of table4)
fill b0 expl b1 expl b1   (overwrite where needed)
b0=+ b0 32
if b1<31
b1=+ b1 1
repeat
endif
endbegin
bufptr =hex a010          (deselect byte unpacking)
b0=+ b0 2 endfn
function shdtblx4;
(make 3rd quadrant of tbl4 4x)
bufptr = hex a010         (select processor)
bufptr2 = hex c230        (select table 4 only)
bufptr4 = hex b200        (set address at upper half of table)
bufptr6 = hex a210        (select bytepacking)
bufptr8 = hex c480        (download 256 bytes in packed form)
b0= +b0 10
bsub0= +b0 256
b1=hex 0004               (init start of table)
b2=hex 0808
begin                     (4x table)
bufptr=expl b1
b0= +b0 2
if b0 11t bsub0
b1= +b1 expl b2
repeat
endif
endbegin
bufptr=hex a010           (deselect byte unpacking)
b0= +b0 2 endfn
``` function shdtblx;
(Generate tables for median-video, expanding sum of four 5 bit maxwhite values to true difference (dif). High order table should be of for negative output. Output is added to video to correct for shading. Generate in packed form. Write to tables 0,1.)

```
bufptr = hex a010         (select processor)
bufptr2 = hex c222        (select table 1)
bufptr4 = hex b000        (zero address)
bufptr6 = hex a210        (select bytepacking)
bufptr8 = hex c480        (download 256 bytes in packed form)
b0= + b0 10
bsub0= +b0 128
b1=expl − s11 dif 6 dif   (init output of table at 63 x dif)
begin                     (generate rest of 32 output states)
bytptr=sra expa b1 6
b0= + b0 1
if b0 11t bsub0
b1= − b1 expl dif
repeat
endif
endbegin
fill b0 expl _dif 128     (last output is _dif)
                          (fill out rest of table
                           with _dif)
b0= + b0 128
bufptr = hex a010         (select processor again)
```

```
bufptr2 = hex c221      (write to table 0)
bufptr4 = hex b000      (zero address)
bufptr6 = hex a210      (select bytepacking)
bufptr8 = hex c480      (download 256 bytes in packed form)
b0 = + b0 10
zero b0 64              (first 64 output states are positive)
b0 = + b0 64
fill b0 15 192          (set sign bits for rest)
b0 = + b0 192
bufptr = hex a010       (deselect byte unpacking mode)
b0 = + b0 2 endfn
``` function mtable msk(h) s(h);

(write processor tables specified by msk—download in packed form) (if to table 4, download 512 bytes, rest take 256)

```
bufptr = hex a010
if msk < 0                  (if msk negative, create signed table)
msk = __msk
bufptr2 = +hex c220 msk     (write to tables set in msk)
bufptr4 = hex b080          (address counter = __128)
b1 = __128
else
b1 = 0
bufptr2 = +hex c220 msk     (write to tables set in msk)
bufptr4 = hex b000          (address counter = 0)
endif
bufptr6 = hex a210          (select processor and byte unpacking)
bufptr8 = hex c480          (download 128 packed words)
bsub0 = +b0 266             (256 + init sequence length)
if msk = hex 10             (special case for table 4)
if s < 0 (expecting more than 8 bits, so extend divide table)
b1 = expa s11 expa b1 1 (double tbl length, so double b1)
if b1 < 0                   (signed divide)
bufptr4 = hex b300          (start at __256 address)
endif
bufptr8 = hex c400          (download 256 packed words)
bsub0 = +b0 522             (512 + init sequence length)
endif
endif
b0 = + b0 10                (init sequence length)
if s > 0                    (multiply)
begin
bytptr = expl and 255 s11 expl b1 s
b0 = + b0 1
if b0 11t bsub0
b1 = + b1 1
repeat
endif
endbegin
else                        (divide)
s = 
begin
bytptr = expl and 255 srl expl b1 s
b0 = + 1
if b0 11t bsub0
b1 = + b1 1
repeat
endif
endbegin
endif
bufptr = hex a010           (deselect byte unpacking mode)
b0 = + b0 2 endfn
``` function zerotbl msk(h);

(zero the table defined by msk. Output in packed form)

```
bufptr = hex a010
bufptr2 = +hex c220 msk     (write to tables set in msk)
bufptr4 = hex b000          (zero address counter)
bufptr6 = hex a210          (select byte unpacking too)
bufptr8 = hex c480          (download 256 bytes in packed form)
b0 = + b0 10
zero b0 256                 (fill the table with zeros)
```

```
b0 = + b0 256
bufptr = hex a010           (deselect byte unpacking mode)
b0 = + b0 2 endfn
``` function tb1121 msk(h);

(Write 1:1 processor tables specified by msk—download in packed form) (If to table 4, download to quadrants specified by high order byte of msk. The first nibble gives the starting address, the second gives the final address. If both are zero, do the zeroth quadrant only. The table loading must be contiguous. Thus, to download all four quadrants of (b14, msk should be hex 4010.)

```
bufptr = hex a010             (select processor)
bufptr2 = +hex c220 and hex 001f msk  (write to tables set in msk)
bsub1 = expa srl and msk hex f000 4   (end of table - may be zero)
msk = and hex 0f00 msk        (address of start of table)
bufptr4 = hex a210            (select both processor and byte unpacking)
bufptr6 = or hex b000 msk     (starting table address)
bufptr8 = hex c480            (download 128 packed words)
b0 = + b0 10                  (init sequence length)
bsub0 = +b0 256               (point to end of 1st section)
b1 = 1
b2 = hex 0202
begin
bufptr = expl b1
b0 = + b0 2
if b0 11t bsub0
b1 = +b1 expl b2
repeat
endif
endbegin
msk = +msk hex 100            (point to address of current
                               end of table)
if bsub1 > expl msk           (real end of table > current
                               end of table)
b1 = —bsub1 expl msk          (address difference)
b1 = +b1 srl expl b1 7        (total number of bytes to copy)
movechar b0 —bsub0 258        (replicate 1:1 table)
expl b1
b0 = +b0 expl b1
endif
bufptr = hex a010             (deselect bytepacking)
b0 = +b0 2 endfn
``` function clip4;

(clip to real video in table 4. Generate table 4 in packed form)

```
tbl121 hex 10           (1st quadrant of table 4)
bufptr = hex a210       (select bytepacking)
bufptr2 = hex c480      (start second quadrant)
b0 = +b0 4
fill b0 hex ff 256      (clamp video above 255 to 255)
b0 = + b0 256
bufptr = hex c400       (download 512 bytes in packed form)
b0 = + b0 2
fill b0 hex 00 512      (clamp video below 0 to 0)
b0 = + b0 512
bufptr = hex a010       (deselect byte unpacking)
b0 = + b0 2 endfn
```

Having thus described our invention, what we claim as new and desire to secure by Letters Patent is:

1. A method for correcting shading effects in a video image using a histogram of gray scale intensity values of picture elements or pels making up the image, which histogram contains a median and black and white color extremes, comprising the steps of:

generating a histogram of distribution of gray scale intensity values of the pels in an original image to be corrected:

determining an acceptable range of background intensity values by:

calculating the median and the black and white color extremes in the histogram: and calculating the distance between the histogram median and the color extreme on the side of the median having the majority of gray scale intensity values and setting said range as twice that distance centered at the median;

creating a first background image by sampling the gray scale intensity value of each pel to be corrected and setting all values outside of said acceptable range to that of the color extreme least distant therefrom;

creating a duplicate background image from said first background image;

sampling the gray scale values of a number of pels in a predetermined region around a first pel in said duplicate background image;

changing the value of the pel in said first background image corresponding to said first pel, to the largest value among those of said first pel and the sampled pels;

continuing the foregoing sampling and changing steps until all of the pel values in said first background image have been changed accordingly;

changing the duplicate background image in accordance with the changes in said first background image;

repeating the sampling step over a larger region and a larger number of pels with the corresponding changing in the first background image; and repeating the foregoing changing until a desired corrected background image is obtained which becomes the shading correction for the original image.

2. A method as in claim 1 further comprising the steps of carrying out a further correction while sampling by detecting changed pel values below a given value and storing indications thereof; and using said indications to cause only said below value pels to be corrected during subsequent sampling and changing.

3. A method as in claim 2 wherein said method is carried out in a computer and said indications are stored in an overlay plane, which indications are changed during successive samplings accordingly to provide a check as to the adequacy of the corrected image.

4. A method for correcting shading effects in a video image using a histogram of gray scale intensity values of picture elements or pels making up the image, which histogram contains a median and black and white color extremes, comprising the steps of:

generating a histogram of distribution of gray scale intensity values of the pels in an original image to be corrected;

determining an acceptable range of background intensity values by:

calculating the median and the black and white color extremes in the histogram; and calculating the distance between the histogram median and the color extreme on the side of the median having the majority of gray scale intensity values and setting said range as twice that distance centered at the median; and creating a correction image by:

comparing the gray scale intensity value of each pel to be corrected in the original image with the median value and calculating respective difference values;

correcting the value of each said pel by its respective difference value when the latter is within said range; and not correcting the value of each said pel when its respective difference value is outside of said range.

5. A method as in claim 4 wherein said original image is remapped to said correction image using a lookup table, the output of which is said respective difference values.

6. A method as in claim 4 comprising the further steps of:

sampling the gray scale values of a number of pels in a predetermined region around a first pel in said correction image;

summing said sampled values and dividing the sum by the number of samples to obtain an average value and using said average value to correct the value of said first pel; and continuing the foregoing summing and correcting steps until all of the pels in said correction image have been corrected accordingly;

7. A system for correcting shading effects in a video image using a histogram of gray scale intensity values of picture elements or pels making up the image, which histogram contains a median and black and white color extremes, comprising:

means for generating a histogram of distribution of gray scale intensity values of the pels in an original image to be corrected;

means for determining an acceptable image of background intensity values comprising:

means for calculating the median and the black and white color extremes in the histogram; and means for calculating the distance between the histogram median and the color extreme on the side of the median having the majority of gray scale intensity values and setting said range as twice that distance centered at the median;

means for creating a first background image by sampling the gray scale intensity value of each pel to be corrected and setting all values outside of said acceptable range to that of the color extreme least distant therefrom;

means for creating a duplicate background image from said first background image;

first means for sampling the gray scale values of a number of pels in a predetermined region around a first pel in said duplicate background image:

first means for changing the value of the pel in said first background image corresponding to said first pel, to the largest value among those of said first pel and the sampled pels;

means for reactivating said first sampling and changing means until all of the pel values in said first background image have been changed accordingly;

second means for changing the duplicate background image in accordance with the changes in said first background image;

second means for sampling the gray scale values in said duplicate image over a larger region and a larger number of pels than said first sampling means and activating said first changing means to make the corresponding changes in the first background image; and means for activating said second changing means until a desired corrected background image is obtained which becomes the shading correction for the original image.

8. A system as in claim 7 further comprising:

means for carrying out a further correction while sampling by detecting changed pel values below a given value and storing indications thereof; and means for using said indications to cause only said below value pels to be corrected during subsequent sampling and changing.

9. A system as in claim 8 wherein said carrying out means comprises:

computer means for storing said indications in an overlay plane, and for changing said indications during successive samplings accordingly to provide a check as to the adequacy of the corrected image.

10. A system for correcting shading effects in a video image using a histogram of gray scale intensity values of picture elements or pels making up the image, which histogram contains a median and black and white color extremes, comprising:

means for generating a histogram of distribution of gray scale intensity values of the pels in an original image to be corrected;

means for determining an acceptable range of background intensity values comprising:

means for calculating the median and the black and white color extremes in the histogram; and means for calculating the distance between the histogram median and the color extreme on the side of the median having the majority of gray scale intensity values and setting said range as twice that distance centered at the median; and means for creating a correction image comprising:

means for comparing the gray scale intensity value of each pel to be corrected in the original image with the median value and calculating respective difference values;

means for correcting the value of each said pel by its respective difference value when the latter is within said range; and means for not correcting the value of each said pel when its respective difference value is outside of said range.

11. A system as in claim 10 further comprising means for remapping said original image to said correction image using a lookup table, the output of which is said respective difference values.

12. A system as in claim 10 further comprising:

means for sampling the gray scale values of a number of pels in a predetermined region around a first pel in said correction image;

means for summing said sampled values and dividing the sum by the number of samples to obtain an average value;

means using said average value correcting the value of said first pel; and means for reactivating said summing means and said correcting means until all of the pels in said correction image have been corrected accordingly.

* * * * *